United States Patent [19]

Moore

[11] 4,303,404
[45] Dec. 1, 1981

[54] INFINITELY VARIABLE RATIO TRANSMISSION APPARATUS

[76] Inventor: George E. Moore, 7440 N. Park Ave., Indianapolis, Ind. 46240

[21] Appl. No.: 69,787

[22] Filed: Aug. 27, 1979

[51] Int. Cl.³ ............................ F16G 1/24; F16G 5/18
[52] U.S. Cl. .................................... 474/242; 474/40; 474/246
[58] Field of Search ............... 474/201, 237, 238, 206, 474/219, 240, 242, 245, 246, 272, 228, 149, 37, 39, 40, 265, 8; 198/851

[56] References Cited

U.S. PATENT DOCUMENTS

| | | | |
|---|---|---|---|
| 515,004 | 2/1894 | Loomis | 474/206 |
| 580,369 | 4/1897 | Bultz et al. | 474/206 X |
| 803,811 | 11/1905 | Cutter | 474/149 X |
| 998,002 | 7/1911 | Holsman | 474/149 X |
| 1,501,705 | 7/1924 | Decoux . | |
| 1,662,654 | 3/1928 | Abbott . | |
| 1,814,883 | 7/1931 | Abbott . | |
| 1,953,388 | 4/1934 | Bettin | 198/851 X |
| 1,966,831 | 7/1934 | Oakes et al. . | |
| 2,073,846 | 3/1937 | Maurer | 474/243 |
| 2,279,134 | 4/1942 | Dalrymple | 474/228 |
| 2,550,431 | 4/1951 | Shaw | 474/242 X |
| 2,894,405 | 7/1959 | Carle . | |
| 2,913,916 | 11/1959 | Schmidt | 474/201 X |
| 3,016,756 | 1/1962 | Jackel . | |
| 3,718,405 | 2/1973 | Keiter et al. . | |
| 3,906,809 | 9/1975 | Erickson . | |
| 3,916,709 | 11/1975 | Stever et al. | 474/201 X |

FOREIGN PATENT DOCUMENTS 26865 12/1907 United Kingdom ............... 474/206

Primary Examiner—C. J. Husar
Assistant Examiner—Moshe I. Cohen
Attorney, Agent, or Firm—Woodard, Weikart, Emhardt & Naughton

[57] ABSTRACT

A variable ratio transmission apparatus for converting an input torque at a first RPM to an output torque at a second RPM includes a pair of driving discs disposed on an input drive shaft and in spaced parallel ralationship thereto, a pair of driven discs disposed on an output drive shaft and a continuous length of metal link chain extending around and in direct contact with each pair of discs so as to create a high frictional force at the discs and chain interface sufficient to transmit motion from the driving discs to the driven discs. The link chain is arranged as a continuously repeating pattern wherein each pattern includes three generally triangular link plates of a clustered configuration which are interconnected by pins disposed in a first row and a plurality of U-shaped drive members connected to the link plates by pins disposed in a second row. Each repeating pattern includes a pair of outside link plates connected to a pair of intermediate link plates which in turn are connected to a pair of inside link plates. In each repeating pattern each pin connecting together each set of two link plate pairs is disposed between and in direct contact with the edges of the third link plate pairs of two contiguous repeating patterns. The outwardly facing surfaces of each drive member are contoured so as to conform to the surface shape of the driving and driven discs such that the chain is able to move in and out according to disc spacing, thereby realizing different radii.

16 Claims, 14 Drawing Figures

INFINITELY VARIABLE RATIO TRANSMISSION APPARATUS

BACKGROUND OF THE INVENTION

This invention relates in general to infinitely variable ratio transmission drive systems and in particular to such systems which incorporate as the connecting means between the driving and driven discs a continuous length of transmission drive chain.

The concept of infinitely variable ratio transmission drive systems is well known in the art. Such systems involve the placement of two pairs of conical discs on two parallel shafts. The separation between each pair of discs on each shaft is able to be changed such that the connecting drive member (belts or chains) which extends around these pairs of discs will act upon the discs at a different drive radius location. Consequently, if it is desired to step down from a large radius on the input shaft to a small radius on the output shaft, the driving discs are placed close together and the driven discs are placed farther apart. The use of conical shaped discs as the driving and driven members, which are movable to any degree of separation along the two parallel shafts, creates the infinitely variable ratio aspect for the transmission drive system.

Typically, the connecting member is a belt, such as a V-belt whose sides are correspondingly tapered to conform to the driving and driven discs and frictional contact between these tapered sides and the discs is relied upon to transmit and convert input torque at a certain RPM to output torque at a different RPM. Similarly, the discs may be radially grooved and the belts may then include outwardly extending protrusions for a direct drive system. One disadvantage with the use of V-belts is that they are normally constructed from a soft, flexible material and may only be subjected to comparatively low compression forces. Consequently, they must be of an increased size in order to provide sufficient surface area of contact with the discs to provide sufficient friction. This condition results in large diameters to the discs and increases the overall size and weight of the transmission system. There are also other considerations such as the life and durability of the connecting member as well as the speed at which it can be operated.

An awareness of these various drawbacks have led certain inventors to the conclusion that replacement of the synthetic belt material by metal constitutes an improvement to the overall transmission system. Correspondingly, there have been a number of attempts at the utilization of a metal chain as the connecting member between the driving and driven discs. Although this concept overcomes certain disadvantages with the use of V-belts, a number of additional problems have been introduced. Due to the fact that conventional roller chain design is not compatible with the requirements of infinitely variable ratio transmission drive systems, special types of chains have resulted. In order to provide high strength, reliability, prolonged life and sufficient frictional forces, each of the chain concepts which have been conceived have resulted in a quite complex and intricate aggregation of parts. In certain instances the assembly of such chains is extremely complex and the corresponding costs quite high. In other situations where the particular concept is somewhat more basic, the chain does not provide all the necessary attributes that such a chain drive must have in order to be suitable for the variable ratio transmission concepts.

Listed below are several patent references which disclose certain concepts for variable ratio transmission drives and certain chain concepts for use with such drives.

| U.S. PAT. NO. | PATENTEE | ISSUE DATE |
| --- | --- | --- |
| 2,073,846 | Maurer | 03/16/37 |
| 2,550,431 | Shaw | 04/24/51 |
| 2,913,916 | Schmidt | 11/24/59 |
| 1,814,883 | Abbott | 07/14/31 |
| 1,966,831 | Oakes et al. | 07/17/34 |
| 1,501,705 | Decoux | 07/15/24 |
| 1,662,654 | Abbott | 03/13/28 |
| 2,894,405 | Carle | 07/14/59 |
| 3,016,756 | Jackel | 01/16/62 |
| 3,718,405 | Keiter et al. | 02/27/73 |
| 3,906,809 | Erickson | 09/23/75 |

Maurer discloses a wedge shaped power transmitting member and system which includes a plurality of disc engaging elements constructed of hardened steel or similar material which are disposed transversely in each chain link and provide a curved surface of contact against the corresponding driving and driven discs. In the various disclosed embodiments the engaging elements are rollers and are arranged such that they may move along the inclined surface of the various discs while providing a frictional surface for transmitting drive motion.

Shaw discloses a variable-speed transmission chain concept wherein the chain is made up of links and pins in a manner similar to conventional power transmitting chains. However, this particular design differs in that the pins extend well beyond the sides of the links and the ends of the pins are conical thereby provding a line contract bearing against the inclined surfaces of the discs in order to create the necessary frictional interface for transmission from input to output.

Schmidt discloses a stepless change speed transmission system wherein a first pair of axially adjustable gear-like toothed conical members are connected to an incoming power shaft and a second pair of axially adjustable gear-like toothed conical members are connected to an outgoing power shaft and a chain having teeth-like elements capable of meshing with the teeth of the conical members is in operative engagement with the various pairs of conical members.

Abbott ('883) discloses a power transmission mechanism of a type similar to Schmidt except that the portions which engage the teeth-like portions of the conical members (discs) are constructed of a plurality of laminations which extend completely through the plurality of link plates.

Oakes et al. discloses a variable speed transmission system which incorporates a pair of facing conical members which are movable one with respect to the other by means of a threaded rod and linkage arrangement. A chain drive concept is disclosed which includes outwardly extending portions from each link which engage the grooves in the conical members.

Decoux discloses a power transmission apparatus operated by means of a flexible member such as a belt wherein the variation of the speed of the power transmissions is effected by varying the operative diameter of one pulley or both pulleys by changing the spacing between facing inwardly tapering conical disc members.

Abbott ('654) discloses an expanding pulley concept in combination with a chain drive for use in transmission systems.

Carle discloses a variable speed transmission which is intended to incorporate an improved belt and pulley arrangement in order to provide variable speed belt transmission in which the limitations imposed by belt slippage are materially reduced. A composite endless belt is provided which has different inner and outer driving surface portions each constructed of different material. One presents a smooth friction drive and the other presents a positive drive.

Jackel discloses a metal reinforced V-shaped belt which is intended to have improved longitudinal strength and is adapted to withstand high lateral forces. The end use for such a belt is intended to be with variable speed drives and adjustable width pulleys of the type used with variable ratio transmission systems.

Keiter et al. discloses a variable speed pulley drive transmission system for overarm machine tools such as drill presses. Although movable conical discs are provided as the transmission means, the connecting means is of a conventional belt design and the patent focuses primarily on the operator controls which permit the variable speed conversion.

Erickson discloses a transmission having an infinitely variable drive ratio wherein a pair of oppositely oriented adjacent splined cone shaped members are interconnected by a selectively positional positive gripping drive chain. The links of the chain are contoured so as to fit over and within the splined protrusions of each cone shaped member.

While the various disadvantages with synthetic (rubber) belt drives are readily apparent as has been mentioned, there are also disadvantages with all-metal chain drive concepts. These disadvantages are seen from the standpoint of cost, complexity and the amount of frictional interference which is provided. At least one attempt has been made to create a V-belt profile from steel in which a plurality of individual steel blocks are connected together by a steel band in much the same manner that link chain is constructed with hopefully improvements from the standpoint of cost and durability. One such attempt has been made by Van Doorne Transmissive BV as set forth in an article entitled "DAF Transmatic Uses Steel Belts for Drive" printed in the *Automotive News* of Feb. 23, 1976. The particular belt developed includes a thin steel band which carries a set of steel blocks each with a V-belt profile. These individual steel blocks fit into pulley grooves and rely on frictional interference for transmission drive.

Although chain drive concepts do provide certain advantages over the use of synthetic V-belts, chain drives also have their own associated problems. Since chain drives are normally utilized to increase the driving speed and the amount of force, they may be subjected to great stresses in a variety of directions with constant forces as well as variable forces. Such stress forces primarily align themselves along the length of the chain as torque is transferred from the imput shaft to the output shaft. These stress forces aligned along the chain result in both shear stresses introduced into the connecting pins as well as severe bending moments. Often chain fatigue and failure results from pin tear out in the link plate holes which is often the result of severe bending moments in the pins which apply pressure at these locations. High stress forces on the pins may tend to elongate or otherwise distort the link plate holes until the fit is so loose that the pins pull out. Consequently, it would be an improvement to such chain designs if means could be provided in a convenient, economical and easily assembled manner to either eliminate or greatly reduce certain of these forces. Reduced forces in turn reduce any adverse effects on the connecting pins and link plates such that great strength and speed can be transmitted while still providing greater chain durability, strength and prolonged life.

The subject invention which is disclosed and described hereinafter achieves these improvements while providing additional advantages and benefits which will be apparent from the following descriptions.

SUMMARY OF THE INVENTION

A variable ratio transmission apparatus for converting an input torque at a first RPM to an output torque at a second RPM according to one embodiment of the present invention comprises a frame housing including an input shaft and an output shaft, a pair of driving discs disposed on said input shaft, a pair of driven discs disposed on said output shaft, and a continuous length of chain extending around and between said driving discs and said driven discs, said length of chain including a plurality of link plates pinned together into said continuous length and a plurality of U-shaped drive members pinned to said link plates, said U-shaped drive members being contiguous with said discs.

One object of the present invention is to provide an improved variable ratio transmission apparatus incorporating chain drive means.

Related objects and advantages of the present invention will be apparent from the following description.

DESCRIPTION OF THE PREFERRED EMBODIMENT

Figures 1, 2:
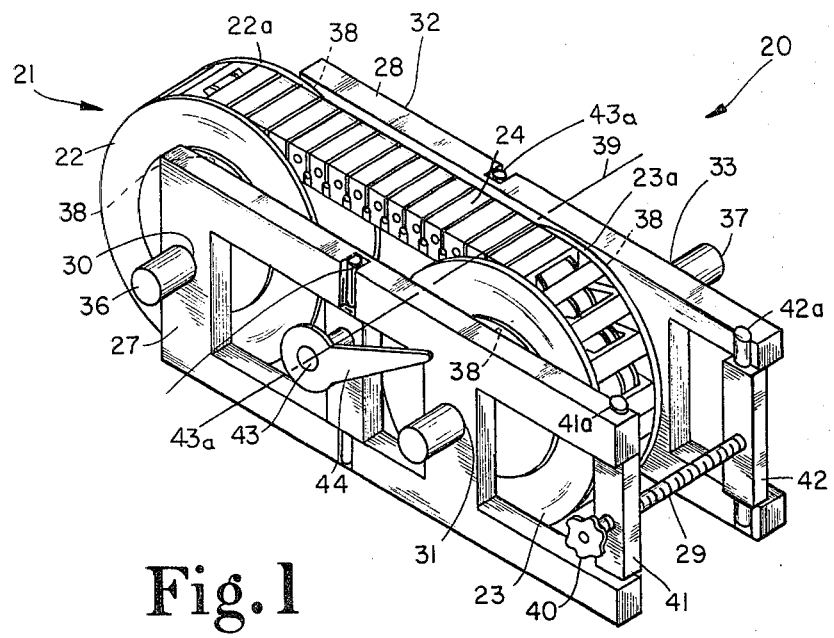
FIG. 1 is a perspective view of a variable ratio transmission apparatus according to a typical embodiment of the present invention.
FIG. 2 is a partial perspective view of a connecting chain member comprising a portion of the FIG. 1 transmission apparatus.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1 there is illustrated an infinitely variable ratio transmission apparatus 20 which incorporates a unique chain drive concept including link plates, connecting pins, drive members in an arrangement which provides greater driving force, durability and overall strength without subjecting the connecting pins to correspondingly greater bending moments or shear forces.

Transmission apparatus 20 includes a support frame 21, a pair of driving wheels or discs 22, 22a, a pair of driven wheels or discs 23, 23a, and a continuous length of link chain 24. Support frame 21, which acts as a type of housing, includes a first arm 27, a second arm 28 and a threaded rod 29 connecting these two arms together. Each arm includes a pair of shaft clearance holes 30 and 31 in arm 27 and holes 32 and 33 in arm 28. Each hole is aligned with the corresponding hole in the opposite arm for spaced apart and parallel receipt of externally splined shafts 36 and 37.

Discs 22 and 22a are correspondingly internally splined and disposed on shaft 36 between arms 27 and 28. Disc 22 and 22a are disposed in direct contact with thrust bearings 38 which are positioned between each disc and the corresponding adjacent arm. In either case, chain tension against the discs assists in disc separation when arms 27 and 28 are moved farther apart. Discs 23 and 23a are similarly configured and it is to be understood that the spacing between arms 27 and 28 controls the spacing between each pair of discs. In this regard, arms 27 and 28 are free to move longitudinally along shafts 36 and 37 in order to effect the desired disc spacing.

Although not specifically illustrated, it is to be understood that shafts 36 and 37 may extend beyond arms 27 and 28 for suitable bearing connections to a surrounding housing. Additionally, shaft 36 is elongated in one direction for coupling to an input drive torque and shaft 37 is elongated in the opposite direction for delivery of an output drive torque. As in understandable, the input and output shafts could extend in the same direction from frame 21. The concept of a transmission apparatus involves the conversion of an input torque and RPM to an output torque and RPM. In order to achieve some stepping up or stepping down, the diameter (radius) of the driving discs at which the drive belt (or in this invention, the chain) acts must be different than the corresponding diameter (radius) location of chain contact on the driven discs. The pair of driving discs 22 and 22a coopperatively act as a driving pulley and discs 23 and 23a cooperatively act as a driven pulley.

A concept often employed in prior art devices and in part adopted for the present apparatus involves using conical or fustroconical discs with facing and aligned inwardly tapering surfaces. As the distance of separation between these discs changes, the effective driving radius correspondingly changes. Consequently, in order to cause the separation between one pair of discs to be different than in the other pair of discs, an intermediate pivot point (line 39) for arms 27 and 28 is disposed between shafts 36 and 37. As knob 40 is used to advance threaded rod 29, the spacing between discs 22 and 22a increases and the spacing between discs 23 and 23a decreases. This results in chain 24 moving inwardly (smaller radius) around shaft 36 and outwardly (larger radius) around shaft 37. Conversely, the reverse occurs if knob 40 is turned in a counterclockwise direction to retract threaded rod 29.

In order to permit the type of pivotal movement of arms 27 and 28 as described, a pair of connecting bars 41 and 42 are employed. Bars 41 and 42 are pivotally connected at both top and bottom to arms 27 and 28 by means of pin portions 41a and 42a, respectively, and threaded rod 29 is connected to bars 41 and 42. As rod 29 is advanced (or retracted) bars 41 and 42 move closer together (or further apart), arms 27 and 28 also move correspondingly and the pivotal connection provided by the pin portions precludes the introduction of any bending or tension into arms 27 and 28. The location of threaded rod 29 with respect to the pivot point is effective to move arms 27 and 28 in a manner that the arms are no longer parallel to each other and this creates the resulting different diameters at which the chain acts. It is however possible to move arms 27 and 28 by means of shaft 43 and lever arm 44. These two components further enable an adjustment to the radius of chain contact so that ratios can be easily changed or fine-tuned to a particular value. It should be noted that pivot pins 43a also exist at a location in the approximate center of arms 27 and 28.

Although the particular transmission concept described above is somewhat conventional in many regards, what is not conventional is the use of a metal link chain which includes drive members, as the connecting means between the two pairs of discs. Even though chain drives are known in the art, the disclosed chain of this invention includes U-shaped members which have an outwardly facing surface contour which corresponds to the surfaces of each pair of facing discs. Typically, prior art devices employed a radially grooved surface configuration on the discs and a V-belt with some type of compatible contour to fit within the grooves, and the disadvantages of this type of transmission system have previously been mentioned. The specific construction of chain 24 will now be described as well as a number of alternative configurations. These various alternatives provide a greater degree of adaptability of this chain drive concept to different transmission systems and styles as well as being able to accommodate varying requirements.

Chain 24 includes three varieties of differently used link plates, although each link plate is substantially identical as to material, finish, contour, size and thickness. These link plates are stamped from rolled (coiled) strip stock in a manner consistent with those stamping (blanking) operations employed for roller chain link plates. These three "different" link plate varieties are identified according to their position in the entire chain and relative to each other. The outside link plates 45 comprise the outer link plate surface of the chain and the outside link plates are uniformly spaced apart from each other by a dimension which is equal to the diameter of pin 46 (see FIGS. 2 and 3). Pin 46 extends through clearance holes in the remaining two link plate varieties. Due to the extended length of pin 46, this particular size and location relationship places the facing edges of adjacent outside link plates 45 in direct contact with the outside diameter of each corresponding pin 46 disposed therebetween.

The second variety of link plate is an intermediate link plate 49 and the third variety is an inside link plate 50. The inside link plates are arranged in side by side pairs separated slightly in order to provide clearance for retaining rings which are disposed about the various pins, as will described in greater detail hereinafter. One each of these three varieties of link plates are stair-stepped together in an overlapping, parallel and contiguous relationship. This particular array of three staggered, overlapping, stacked together link plates is repeated in a symmetrical fashion on the oppositely facing side of the chain (note the double stack of two inside link plates at the innermost region of the chain). Furthermore, this staggered stack of three interconnected pairs of link plates continuously repeats itself throughout the entire length of the chain. Even though the link plates may be described in a singular manner during the remainder of the description of this invention, it is to be understood that each connection between link plates and link plate positions relative to each other symmetrically repeat in a continuous manner on each side of the chain and thoughout the entire chain length.

Figure 4:
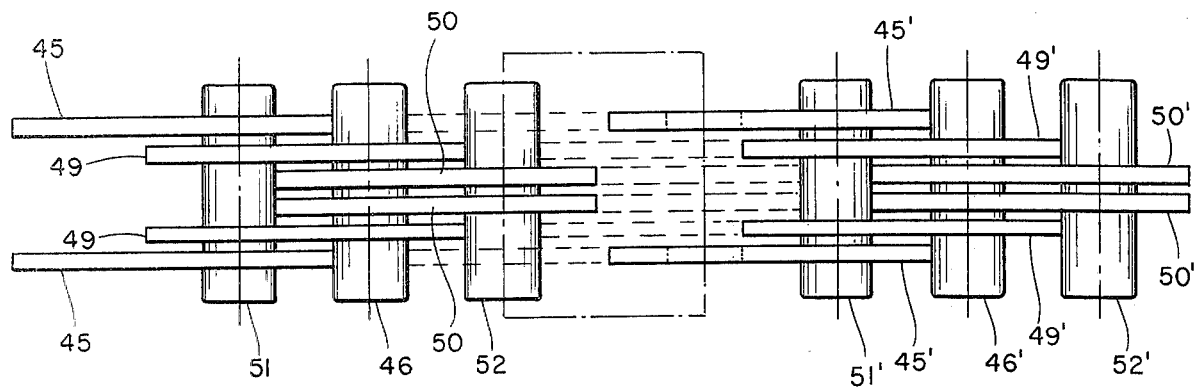
FIG. 4 is a diagrammatic exploded view of the FIG. 2 chain.

Each aligned pair of intermediate link plates 49 is pinned at one end to the overlapping ends of the corresponding outside link plates 45 by means of pin 51. The opposite ends of these intermediate link plates 49 are pinned to the corresponding ends of the inside link plates 50 by means of pin 46. Although adjacent outside link plates 45 overlap a portion of intermediate link plates 49, these outside link plates are pinned to inside link plates 50 by means of pin 52. This pattern then repeats itself as is shown in FIG. 4 and thus the entire length of chain can be viewed as including a continuously connected series of six link plates, two of each variety, and three connecting pins extending therethrough.

Each outside link plate is pinned into position by pins 51 and 52 and the edges of this link plate ride against the outside diameter surface of pin 46. Similarly, the intermediate link plates 49 are pinned into position by pins 46 and 51 and ride directly against pin 52. Finally, the inside link plates are pinned into position by pins 46 and 52 and ride directly against the ouside diameter surface of pin 51. The repeating pattern which is illustrated in FIG. 4 is identified with a prime superscript in order to show related component pieces which are present in the adjoining section of chain. Although the particular construction may at first glance appear to be somewhat haphazard or irregular, it actually follows a very orderly and precise pattern which is clearly represented by FIG. 4.

Each pin of the group of pins 46, 51, 52, 46', 51', 52' etc. is retained in position by the use of a retaining ring located at the center of the pin between the two ends. This position for the retaining ring results in an assembled location for each ring between the facing surfaces of inside link plates 50 and these retaining rings control the link plate spacing as well as retain the pins in their desired location. Alternatively these pins could be secured in place by other related mechanical means such as shoulder contouring of the ends of each pin. Each pin of the group of pins which secure the link plates to the various drive members 53 are similarly retained in place by retaining rings positioned internally to the various drive members. Alternatively, the pins can be anchored in location by means of set screws (one located in each drive member) extending into contact with the surface of the corresponding pin.

Figure 5:
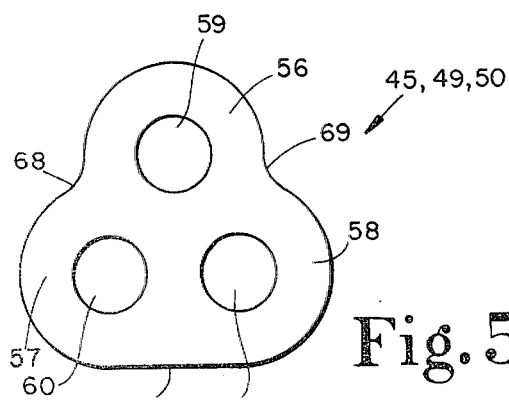
FIG. 5 is a front elevation view of a link plate comprising a portion of the FIG. 2 chain.

While the interconnection and pinning together of the various link plates constitutes one important aspect of the subject invention, the peripheral shape of each link plate provides a unique cooperating structure which further contributes to the novelty and advantages of the overall chain design. Each link plate (see FIG. 5) is configured as a cluster of three generally circular portions 56, 57 and 58 which slightly overlap and the cluster has a generally triangular appearance. Each circular portion has a pin-receiving clearance hole 59, 60 and 61, respectively, centrally disposed through each corresponding circular portion. Since all pins associated with the structure are substantially of the same diameter, the fit of each pin into each clearance hole is substantially the same. The clearance hole diameters are only a few thousandths of an inch larger than the outside diameter of the pin such that there is a snug yet freely pivoting fit between the pin and the clearance hole.

Figure 3:
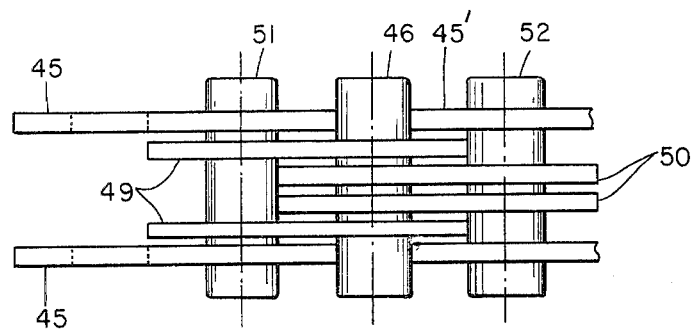
FIG. 3 is a partial, fragmentary bottom plan view of the FIG. 2 chain.

FIG. 3 represents a bottom plan view of the chain and the previous description about pins 46, 51 and 52 refers soley to those pins extending through holes 60 and 61 of each link plate. Correspondingly, edges 64 of each link plate constitute the inside diameter surface or edge of the continuous length of chain 24. Hole 59 of each link plate is used for receiving yet further pins as part of the overall chain assembly. The use of this top hole is to secure the link plates to the various drive members 53, as previously mentioned, and a sequential yet staggered pattern is followed.

Figure 6:
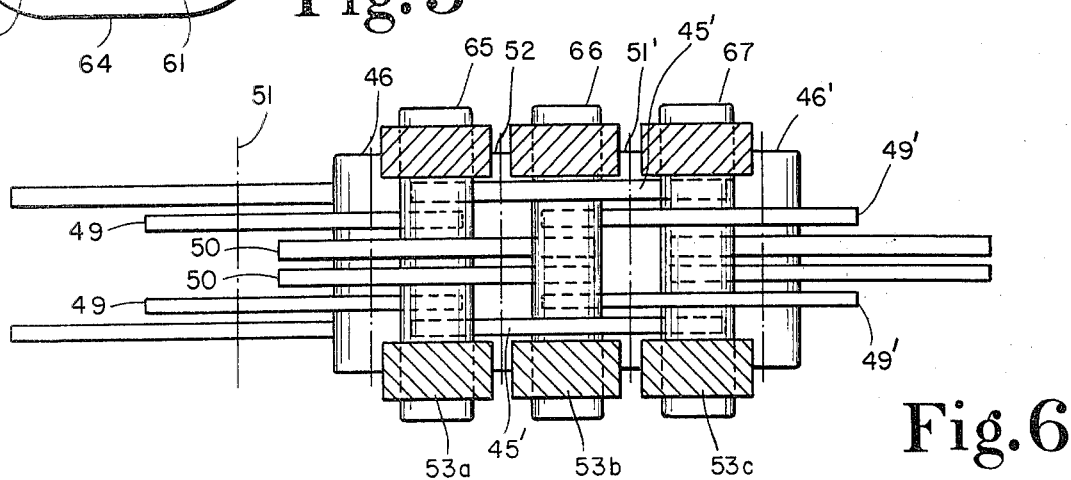
FIG. 6 is a partial, fragmentary top plan view of the FIG. 2 chain.

Referring to FIG. 6 a fragmentary top plan view of chain 24 is provided and the location pins 65, 66 and 67 relative to pins 46, 51 and 52 is illustrated. It is to be understood that pin 65 extends through member 53a and through the pair of inside link plates 50. Pin 66 extends through member 53b and through the two outside plates 45. Finally, pin 67 extends through member 53c and through the two intermediate link plates 49. Drive member 53 is intended to represent in a generic sense all drive members of continuous link chain 24 while drive members 53a–53c represent specific drive members of the overall plurality. The perimeter edge of each link plate 45, 49 and 50 includes three convex edge portions corresponding to circular portions 56, 57 and 58 alternating with two concave edge portions 68 and 69. These concave edge portions directly ride against the outside diameter surface of corresponding ones of pins 65, 66 and 67. As can probably best be visualized by FIG. 7, pin 65 is contacted by concave edge portion 69 of intermediate link plate 49 at a first location along pin 65. Similarly concave edge portion 68 of outside link plate 45 directly rides against pin 65 at a second more outwardly location. The points of contact of pin 65 by edge portions 68 and 69 are quite close together, the difference being due to the overlap of the outside and intermediate link plates.

Figure 7:
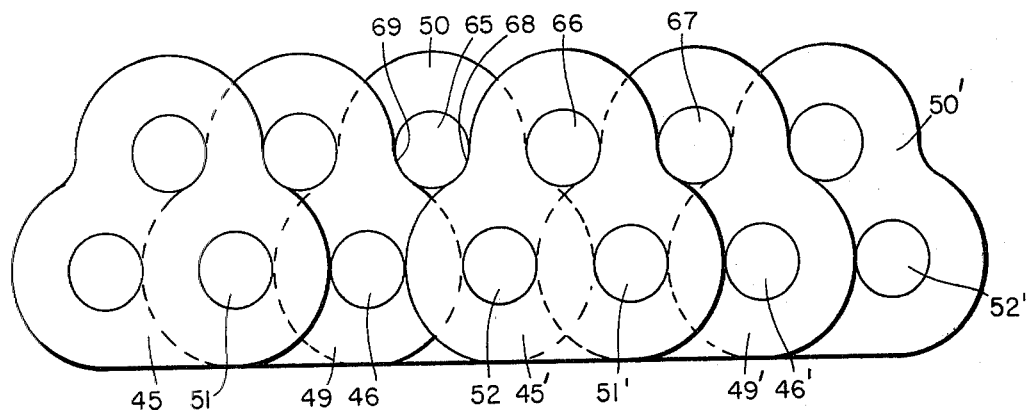
FIG. 7 is a diagrammatic side elevation view of the link plate arrangement comprising a portion of the FIG. 2 chain.

In a related manner, pin 66 is directly contacted by edge portion 69 of inside link plate 50 and by edge portion 68 of intermediate link plates 49, and although the location of contact of the link plates to the pin are substantially adjacent, the intermediate link plates are outward of the inside link plate. Finally, pin 67 is directly contacted by concave edge portion 69 of outside link plate 45 and by concave edge portion 68 of inside link plate 50. FIG. 7 diagrammatically illustrates a view of the link plates comprising chain 24 and since this view is from only one side of the chain, it is to be understood that a repeated substantially symmetrical and identical relationship holds true for the opposite side of the chain wherein each link plate illustrated in FIG. 7 has a second aligned link plate directly therebehind. FIG. 7 also illustrates that the two lower convex edge portions (those corresponding to generally circular portions 57 and 58) of the various link plates ride against corresponding pins of the group of pins 46, 51, 52, 46', 51' etc. This arrangement results in placing each pin in a sandwiched configuration and the curvatures of the concave convex edge portions of each link plate are compatible with the various outside diameters of each pin. Consequently, inasmuch as the various pins and link plates are assembled in a directly contacting manner to each other, this direct contact is retained at each point along the chain regardless of the speed at which the chain runs or the amount of flex or curvature placed in the chain as it wraps around the two pairs of discs. Although pins 46, 51 and 52 act as pivoting points for the various link plates, the direct contact between the link plate edges and the pin outside diameters remains and as the chain curves around these pairs of discs, the edges of the link plates slide across their corresponding pin surfaces without interruption or interference.

The result achieved is quite unique and adds greatly to the overall strength and durability of the chain itself as well as the life of the chain. This in turn contributes greatly to prolonged life of the transmission apparatus. As the various drive members make pressure contact against the driving and driven discs, the frictional interference of the contacting surfaces prevents relative movement between the drive members and discs and thus this chain is an effective means to transfer power from the driving discs to the driven discs. The pulling force exerted on the sides of each member 53 is transmitted to pins 65, 66 and 67 and from there to the corresponding link plates. Since the leading and trailing edges of each drive member 53 are contoured at their lower most portions to fit between and against adjacent pins of the group of pins 46, 51, 52, 46' etc. (see FIG. 2), this pulling force is also exerted on the pin which is in contact with each drive member and this pin is effectively pushed forward.

Figure 8:
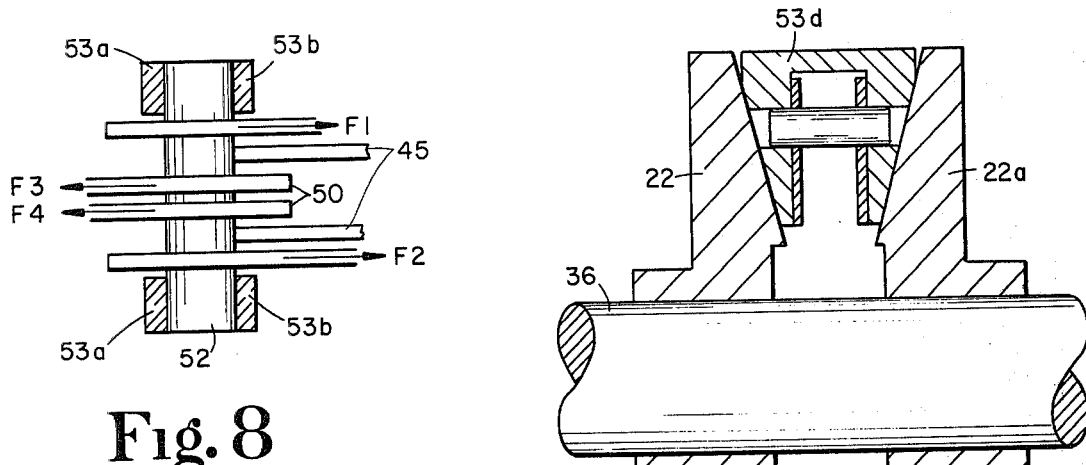
FIG. 8 is a diagrammatic view of force vectors acting on one of the connecting pins comprising a portion of the FIG. 2 chain.

For example purposes, consider drive member 53b as being pulled to the right by the transmission operation. Pin 66 transmits a pulling force to the outside link plates 45 at the location of clearance hole 59 and pushes against pin 51'. Pin 51' is supported in a direction opposite to this force by the contoured lower portion of member 53c thereby reducing any shear forces seen by the end of the pin as well as effectively eliminating any bending moments in the pin. The outside link plates 45 also act against pin 51' with a pushing force and on pin 52 with a pulling force. However, pin 52 is also backed up by member 53b, outwardly of the location where the outside link plates and pin 52 are joined. Consequently, the effective shear force seen by the pin is reduced. Pin 52 is also acted on with a resistive force opposite to the direction of chain movement by inside link plates 50 and this reduces the bending moment which would otherwise be introduced into the pin due to the forces acting at opposite ends of the pin. By providing intermediate support points by means of inside link plates 50 between the two points of pulling force provided by outside link plates 45 the span between the two force points is reduced. FIG. 8 is a diagrammatic representation of the forces acting on pin 52. Forces F1 and F2 are due to the outside link plates 45 and forces F3 and F4 are resisting forces acting through the inside link plates 50. Portions 53a and 53b correspond to the contoured lower portions of drive members 53a and 53b. This arrangement, followed throughout the length of the chain in substantially the same manner results in increased chain strength and prolonged life. Forces acting on the pins are either balanced and opposed or compensated for in order to reduce shear force effects and bending moments.

Pin 66 is also sandwiched between intermediate link plates 49 and inside link plates 45 and the resulting force vectors when combined with the various support and backup surfaces of the other link plates means that pin 66 (likewise pins 65 and 67, etc.) is provided with the same kind of strength enhancement and prolonged life provided to pins 46, 51, 52, 46', 51' etc. By reducing the distance between the pulling force location and the resisting (supporting) force locations, bending moments to the pin are virtually eliminated. Shearing forces are also greatly reduced by this very unique interlocking and interacting chain assembly. In certain areas, such as the outer most ends of pins 46, 51, 52, 46' etc. a pushing force (contoured lower portion of member 53a acting on pin 52) is completely offset by a backup surface, in this case the corresponding surface of member 53b. A similar situation occurs with pin 46 and the adjacent outside link plates which ride against the outside diameter of this pin. Pin 52 is sandwiched and fully support by the adjacent pairs of intermediate link plates and pin 46 by the inside link plates. These and related pin and link plate relationships can be fully appreciated from a review of the various drawing figures provided.

Figure 9:
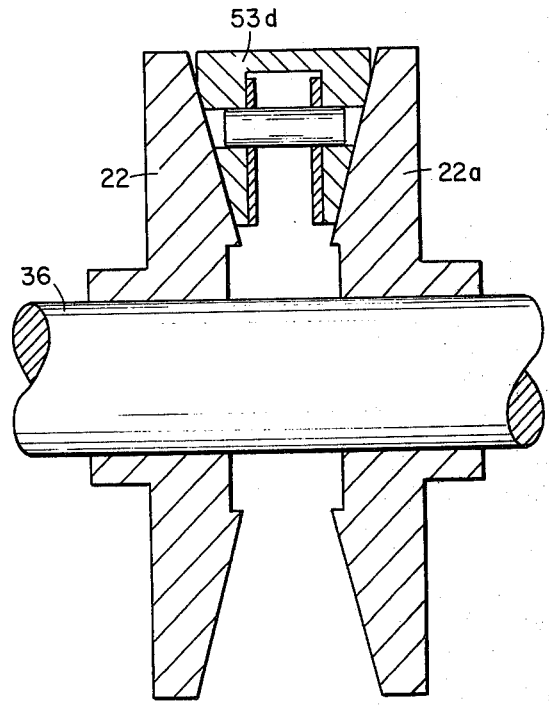
FIG. 9 is a diagrammatic front elevation view of the FIG. 2 chain in contact with disc members which comprise a portion of the FIG. 1 transmission apparatus.

FIGS. 9, 10, 11 and 12 are diagrammatic illustrations of how the various drive members 53 are configured depending upon the particular shape of the corresponding discs with which chain 24 is used. FIG. 9 represents an arrangement wherein both discs (whether driving or driven) are conical in shape and this corresponds to most infinitely variable ratio transmission devices. One disadvantage with this concept is that each U-shaped drive member 53d makes only line contact with the curved conical surface of the various discs and thus the area for frictional contact is somewhat limited. Since the exemplary embodiment of chain 24 involves only the use of frictional forces occurring between the drive members and the discs, the greater the area of contact for a given pressure, the greater the frictional interference will be and thus the greater capabilities for driving power. The frictional forces existing between the drive members and the discs are of a compound nature due to the inclined conical shape of the discs wherein there is a longitudinal compressive force exerted by the discs on the sides of the drive member and by the drive member inwardly and downwardly as if attempting to separate the discs. Member 53d has a generally U-shaped configuration which extends both up the sides and over the top of the collection of various link plates, and the sides of drive member 53d are correspondingly cut at a tapered angle to correspond to the shape of the conical surfaces of the two discs.

Figure 10:
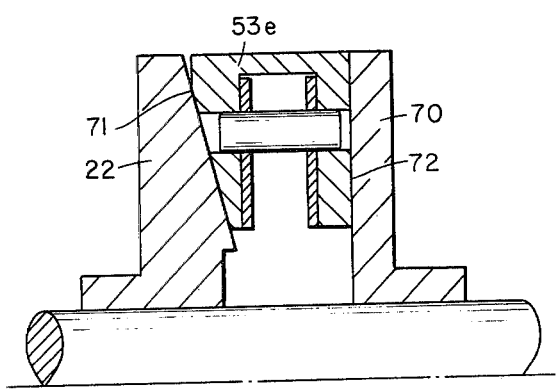
FIG. 10 is a diagrammatic view of an alternative to the FIG. 9 arrangement.

Although FIG. 9 may represent a very common disc arrangement for infinitely variable ratio transmission devices, FIG. 10 provides an improvement over the FIG. 9 arrangement by its providing of a flat disc 70 used in combination with a tapering conical disc such as disc 22. This particular arrangement accommodates both the need for a tapering surface (for a variable radius) and the desirability of a greater surface area of frictional contact. Correspondingly, U-shaped drive member 53e is provided with one tapered surface 71 and one substantially flat surface 72 on the opposite side. In this manner the corresponding chain is able to move upwardly and downwardly to effect a location of changing radius while still providing the significant advantages of a greater surface area of contact along flat disc 70.

Figure 11:
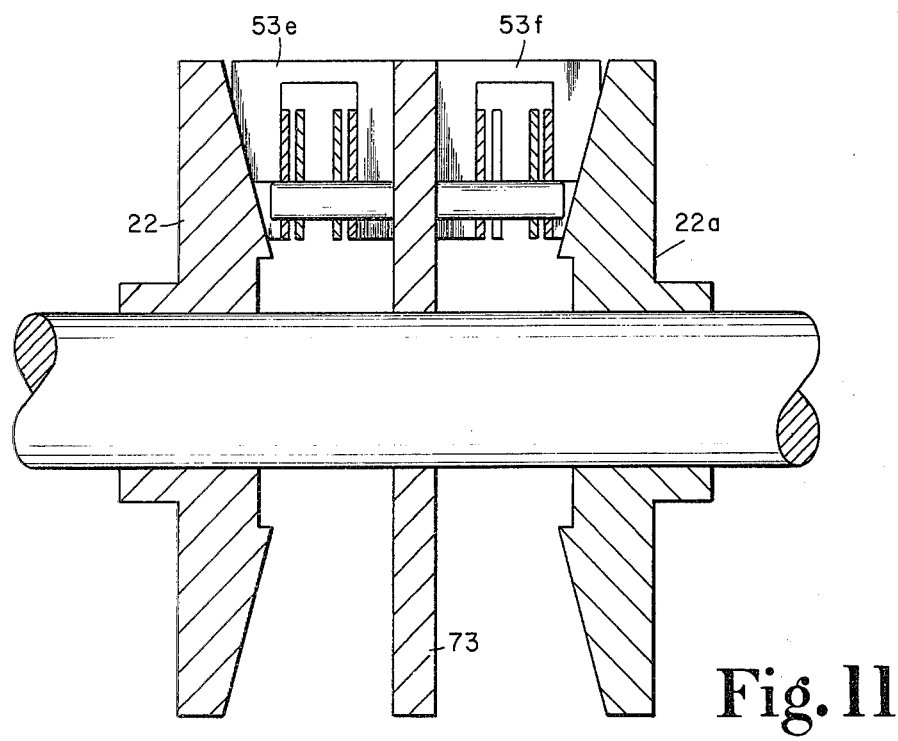
FIG. 11 is a diagrammatic view of a double stranded chain comprising yet another alternative arrangement to the FIG. 9 arrangement.
Figure 12:
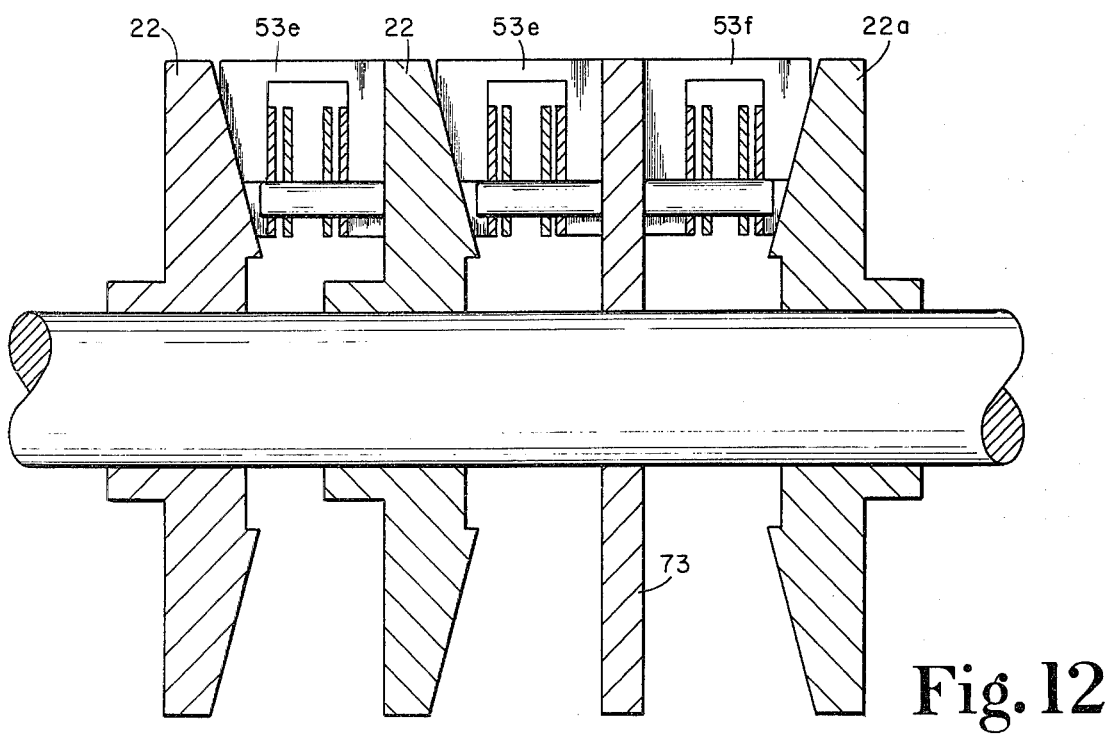
FIG. 12 is a diagrammatic view of a triple stranded chain comprising yet another alternative to the FIG. 9 arrangement.

FIG. 11 and 12 represent double and triple drive concepts and all the invention principles previously set forth and described are correspondingly relevant to these two configurations. The only addition is the use of an intermediate floating plate 73 which is disposed on the correspondingly splined shafts and provides a contacting surface for the chain drive members similar to the function of substantially flat disc 70. In the FIG. 11 illustration, conical discs 22 and 22a are provided and although a drive member 53e may be used on one side a oppositely contoured drive member 53f must be used on the opposite side. Plate 53 is also suitable for transmitting driving torque from the input shaft to the output shaft of the transmission apparatus 20. A further set of alternative features of the subject invention are also illustrated by FIG. 9–12 wherein the pins which connect the various link plates together may be elongated so that they extend to a point of contact against either or both of the corresponding discs. By extending the pins to a point of contact with the discs additional surface area contact is provided and this creates greater frictional forces which improve the driving capabilities of the chain. When this particular elongated pin concept is used with the tapered conical discs, the end of the pin is correspondingly contoured so as to fit flush against the tapering surface.

Figure 13:
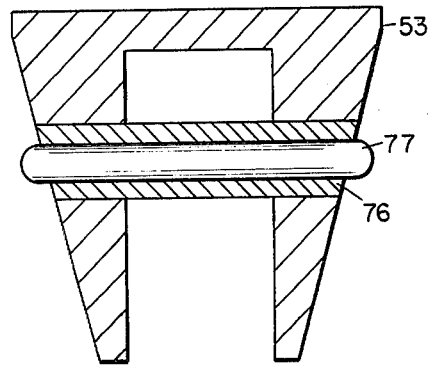
FIG. 13 is a front elevation view of a connecting pin and drive member assembly comprising an alternative arrangement of the FIG. 2 chain.
Figure 14:
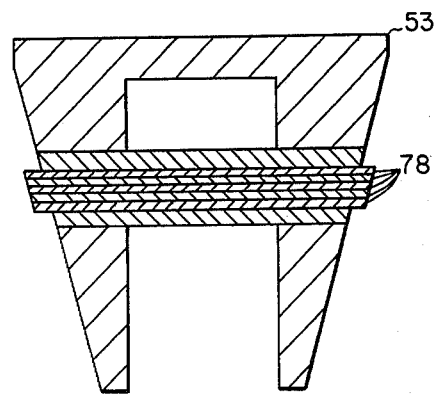
FIG. 14 is a front elevation view of a connecting pin and drive member assembly comprising yet another alternative to the FIG. 2 chain.

It is also envisioned that the group of pins 65, 66 and 67 be elongated to extend beyond the sides of the various drive members and that the discs which are used in combination with chain 24 be radially grooved to a size and configuration compatible with the pin diameter and spacing. In this manner the ends of the pins will be able to fit within the grooves of the discs in order to provide direct driving force rather than merely frictional driving force. This direct driving concept may be used independently of any frictional forces as well as in combination with frictional forces. As is illustrated in FIG. 13, a hollow bushing 76 may be placed through drive member 53 and its ends terminated flush with the surfaces of 53. Thereafter an elongated pin 77 is inserted through the hollow inside diameter of bushing 76 and pin 77 extends outwardly from the sides of drive member 53. It is the outwardly extending portions of each pin 77 at each end which is utilized for the direct driving of the discs. Alternatively, a hollow pin may broached with a square or similarly configured clearance hole and laminations inserted through the hole such that the ends of the laminations extend beyond the sides of drive member 53 and are sufficient to extend into the radial grooves of correspondingly configured discs (see FIG. 14). Such laminations may be notched and pinned to maintain proper alignment and spacing. Regardless of the particular concept employed whether frictional forces only or frictional forces in combination with direct drive or direct drive only, the drive members and link plates are the same. The only difference involves the particular pins, bushings and/or laminations which are used to connect the various link plates to each other and to connect these link plates to the various drive members. Any differences in the particular drive members are controlled only the particular discs which are employed as part of the transmission apparatus.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A variable ratio transmission apparatus for converting an input torque at a first RPM to an output torque at a second RPM, said variable ratio transmission apparatus comprising:
a frame housing including an input shaft and an output shaft;
a pair of driving discs disposed on said input shaft;
a pair of driven discs disposed on said output shaft; and
a continuous length of chain extending around and between each pair of discs, said length of chain comprising:
(a) a first plurality of connecting pins;
(b) a second plurality of connecting pins; and
(c) a plurality of link plates pinned together by said second plurality of connecting pins into said continuous length; and
(d) a plurality of U-shaped drive members pinned to said link plates by means of said first plurality of connecting pins, there being a single U-shaped drive member corresponding to each pin of said first plurality and each U-shaped drive member being pinned to its corresponding link plates by a single pin of said first plurality, said U-shaped drive members being contiguous with said discs.

2. The variable ratio transmission apparatus of claim 1 wherein one disc of said pair of driving discs is substantially identical to one disc of said pair of driven discs and the other disc of said pair of driving discs is substantially identical to the other disc of said pair of driven discs and said U-shaped drive member has a first surface with a contour corresponding to said one disc of each pair and a second surface with a contour corresponding to said other disc of each pair.

3. The variable ratio transmission apparatus of claim 1 wherein each link plate has a generally triangular configuration formed by a cluster of three substantially circular portions, each circular portion including a pin clearance hole extending therethrough and substantially centered therewith.

4. The variable ratio transmission apparatus of claim 1 wherein said plurality of link plates are arranged in a repeating pattern, each pattern comprising three pairs of overlapping, staggered interconnected link plates.

5. A variable ratio transmission apparatus comprising:
an input shaft;

a driving pulley arrangement disposed on said input shaft;

an output shaft;

a driven pulley arrangement disposed on said output shaft; and a continuous chain coupling said driving pulley arrangement with said driven pulley arrangement, said chain including a first plurality of pins arranged into an outer first row, a second plurality of pins arranged into an inner second row and a repeating pattern of three pairs of overlapping, staggered and interconnected link plates, said link plates being interconnected to each other solely by said second plurality of pins and including a first pair of outside link plates, a second pair of intermediate link plates, and a third pair of inside link plates.

6. The variable ratio transmission apparatus of claim 5 which further includes a plurality of U-shaped drive members attached to said link plates by said first plurality of pins.

7. The variable ratio transmission apparatus of claim 5 wherein each repeating pattern further includes three pins of said outer first row, three pins of said inner second row and three U-shaped drive members attached to said link plates by pins of said outer first row.

8. The variable ratio transmission apparatus of claim 7 wherein a first one of said three drive members is pinned to said pair of inside link plates by a first pin of said outer first row, a second one of said three drive members is pinned to said pair of outside link plates by a second pin of said outer first row and the third drive member of said three drive members is pinned to said pair of intermediate link plates by the third one of said three connecting pins of said outer first row.

9. A variable ratio transmission apparatus comprising:

an input shaft;

a driving pulley arrangement disposed on said input shaft;

an output shaft;

a driven pulley arrangement disposed on said output shaft; and a continuous chain coupling said driving pulley arrangement with said driven pulley arrangement, said chain including:

(a) a repeating pattern of three pairs of overlapping, staggered and interconnected link plates;

(b) a first plurality of connecting pins arranged into an outer first row;

(c) a second plurality of connecting pins arranged into an inner second row;

(d) a plurality of U-shaped drive members attached to said link plates by said first plurality of connecting pins; and (e) said link plates being interconnected to each other solely by said second plurality of connecting pins and said three pairs of overlapping, staggered and interconnected link plates being arranged into a first pair of outside link plates, a second pair of intermediate link plates and a third pair of inside link plates.

10. The variable ratio transmission apparatus of claim 9 wherein the pair of outside link plates of each repeating pattern is interconnectively pinned to the pair of intermediate link plates of said same repeating pattern by one pin of said second plurality of pins, said same pair of intermediate link plates being interconnectively pinned to the pair of inside link plates of said same repeating pattern by a different single pin of said second plurality of pins and said same pair of inside link plates being interconnectively pinned to the pair of outside link plates of the contiguous repeating pattern.

11. A chain drive apparatus for use with variable ratio transmissions and related drive chains, said chain drive apparatus comprising:

a plurality of repeating interconnected subassemblies wherein each subassembly includes:

(a) three pairs of overlapping, staggered and interconnected link plates arranged into a first pair of outside link plates, a second pair of intermediate link plates and a third pair of inside link plates;

(b) three connecting pins arranged into an outer row;

(c) three connecting pins arranged into an inner row; and (d) three drive members attached to said link plates by connecting pins of said outer row.

12. The chain drive apparatus of claim 11 wherein each of said drive members is substantially U-shaped and said overlapping, staggered, link plates are interconnected to each other and substantially enclosed on three sides by said drive members.

13. The chain drive apparatus of claim 11 wherein each of said link plates is of a generally triangular shape including a joined cluster of three generally circular portions, each circular portion including a clearance hole substantially centered in said corresponding circular portion.

14. The chain drive apparatus of claim 13 wherein said three clearance holes are triangularly arranged with a top first hole and bottom second and third holes and wherein said top first hole receives a pin of said outer row for securing a corresponding drive member to said corresponding link plate.

15. The chain drive apparatus of claim 14 wherein said bottom second and third clearance holes receive pins of said first row and said three pairs of overlapping, staggered link plates are interconnected such that the third hole of a first pair of link plates is pinned with the second hole of a second pair of link plates and the third hole of said second pair of link plates is pinned with the second hole of the third pair of link plates.

16. A variable ratio transmission apparatus for converting an input torque at a first RPM to an output torque at a second RPM, said variable ratio transmission apparatus comprising:

a frame housing including an input shaft and an output shaft;

a pair of driving discs disposed on said input shaft;

a pair of driven discs disposed on said output shaft; and a continuous length of chain extending around and between each pair of discs, said length of chain comprising:

(a) a first row of spaced-apart connecting pins;

(b) a second row of spaced-apart connecting pins, said first row and said second row of connecting pins having a substantially constant distance of separation, and the connecting pins of one row being substantially uniformly staggered relative to the connecting pins of the other row;

(c) a plurality of link plates pinned together by said second plurality of connecting pins into said continuous length; and (d) a plurality of U-shaped drive members pinned to said link plates by means of pins of said first row, said U-shaped drive members adapted to extend between and be contiguous with adjacent pins of said second row, said adjacent pins of said second row being substantially equally spaced from and opposite sides of the pin of said first row which pins the particular U-shaped drive member to its corresponding link plates.

* * * * *